(12) United States Patent
Shim et al.

(10) Patent No.: US 8,173,210 B2
(45) Date of Patent: May 8, 2012

(54) METHODS FOR SURFACE MODIFICATION OF NON-DISPERSIBLE METAL NANOPARTICLES AND MODIFIED METAL NANOPARTICLES FOR INKJET BY THE SAME METHOD

(75) Inventors: In-Keun Shim, Seoul (KR); Jae-Woo Joung, Suwon-si (KR); Kwi-Jong Lee, Suwon-si (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 1204 days.

(21) Appl. No.: 11/907,173

(22) Filed: Oct. 10, 2007

(65) Prior Publication Data

US 2008/0090082 A1    Apr. 17, 2008

(30) Foreign Application Priority Data

Oct. 11, 2006    (KR) .................. 10-2006-0098805

(51) Int. Cl.
*B05D 1/30* (2006.01)
*B05D 1/34* (2006.01)
*B05D 1/36* (2006.01)
*B05D 7/00* (2006.01)

(52) U.S. Cl. .................. 427/216; 427/220; 427/435

(58) Field of Classification Search .......... 427/212–220, 427/435
See application file for complete search history.

(56) References Cited

U.S. PATENT DOCUMENTS

| | | | |
|---|---|---|---|
| 5,935,275 A * | 8/1999 | Burgard et al. ............. 23/295 R |
| 6,183,658 B1 * | 2/2001 | Lesniak et al. ............. 252/62.56 |
| 6,291,070 B1 * | 9/2001 | Arpac et al. .................. 428/412 |
| 6,302,940 B2 * | 10/2001 | Murray et al. .................. 75/348 |
| 6,537,665 B2 * | 3/2003 | O'Connor et al. ............ 428/402 |
| 6,887,517 B1 * | 5/2005 | Cook et al. ..................... 427/214 |
| 7,108,915 B2 * | 9/2006 | Adams et al. ................. 428/403 |
| 7,147,917 B2 * | 12/2006 | Adams et al. ................. 428/403 |
| 7,211,135 B2 * | 5/2007 | Berkei et al. ................. 106/31.6 |
| 7,214,361 B2 * | 5/2007 | Harutyunyan et al. .... 423/447.3 |
| 7,244,498 B2 * | 7/2007 | Cook et al. ..................... 428/402 |
| 7,534,490 B1 * | 5/2009 | Goh et al. ..................... 428/402 |
| 7,566,478 B2 * | 7/2009 | Ward et al. ................. 427/249.1 |
| 7,666,915 B2 * | 2/2010 | Zhang et al. ..................... 516/32 |
| 7,892,599 B2 * | 2/2011 | Yadav et al. .................. 427/212 |
| 2004/0033270 A1 * | 2/2004 | Kropf et al. .................. 424/642 |

(Continued)

FOREIGN PATENT DOCUMENTS

JP    08-337737    12/1996

(Continued)

OTHER PUBLICATIONS

Luechinger et al., Graphene-stabilized copper nanoparticles as an air-stable substitute for silver and gold in low-cost ink-jet printable electronics, Nanotechnology 19 (2008) 445201.*

(Continued)

*Primary Examiner* — Hoa (Holly) Le

(74) *Attorney, Agent, or Firm* — McDermott Will & Emery LLP

(57) ABSTRACT

A method for surface modification of non-dispersible metal nanoparticles comprises mixing metal nanoparticles having an amorphous carbon layer on the surface with an alcohol or thiol solvent, mixing a capping molecule having a carboxylic head group in the mixed solution, and separating the metal nanoparticles from the mixed solution and the metal nanoparticles for inkjet printing thus modified.

17 Claims, 6 Drawing Sheets

U.S. PATENT DOCUMENTS

| | | | |
|---|---|---|---|
| 2004/0253374 A1* | 12/2004 | Jung et al. | 427/213 |
| 2005/0008557 A1* | 1/2005 | Yadav et al. | 423/274 |
| 2005/0263456 A1* | 12/2005 | Cooper et al. | 210/660 |
| 2009/0288517 A1* | 11/2009 | Chretien et al. | 75/371 |
| 2010/0266697 A1* | 10/2010 | Dunbar | 424/489 |

FOREIGN PATENT DOCUMENTS

| | | |
|---|---|---|
| JP | 2001-294423 | 10/2001 |
| JP | 2003-311174 | 11/2003 |
| JP | 2004-043285 | 2/2004 |
| WO | WO 02/102907 A1 | 12/2002 |

OTHER PUBLICATIONS

Magdassi et al., Copper Nanoparticles for Printed Electronics: Routes Towards Achieving Oxidation Stability, Materials (2010) 3, 4626-4638.*

Rao et al, Nanoparticle Formation Using a Plasma Expansion Process, Plasma Chem. and Plasma Processing, vol. 15, No. 4, 1995.*

Tavares et al, Plasma synthesis of functionalized metal nanoparticles: from improved dispersion properties to enhanced biomaterials, 2008.*

Yang et al, Selective Removal of Metallic Single-Walled Carbon Nanotubes with Small Diameters by Using Nitric and Sulfuric Acids, J. Phys. Chem. B (2005), 109, 19242-19248.*

Marshall et al, Measurement of functionalised carbon nanotube carboxylic acid groups using a simple chemical process, Carbon 44 (2006) 1137-1141, available online Dec. 22, 2005.*

Tchoul et al, Effect of mild nitric acid oxidation on dispersability, size, and struture of single-walled carbon nanotubes, Chem. Mater. (2007), 19, 5765-5772.*

Wei Zhi-qiang et al., Characterization of carbon encapsulated Fe-nanoparticles prepared by confined arc plasma, Trans. Nonferrous Met. Soc. China 21 (2011) 2026-2030.*

Japanese Office Action, with partial English translation, issued in Japanese Patent Application No. 2007-264546, mailed Nov. 9, 2010.

* cited by examiner

METHODS FOR SURFACE MODIFICATION OF NON-DISPERSIBLE METAL NANOPARTICLES AND MODIFIED METAL NANOPARTICLES FOR INKJET BY THE SAME METHOD

CROSS-REFERENCE TO RELATED APPLICATION

This application claims the benefit of Korean Patent Application No. 10-2006-0098805 filed on Oct. 11, 2006, with the Korea Intellectual Property Office, the contents of which are incorporated here by reference in its entirety.

BACKGROUND

1. Technical Field

The present invention relates to a method for surface modification of non-dispersible metal nanoparticles and the metal nanoparticles for inkjet printing thus modified, in particular, to a method for surface modification of non-dispersible metal nanoparticles being used for paste to provide dispersity by chemical modification of the surface and metal nanoparticles thus modified, in which the surface modified metal nanoparticles are suitable for inkjet printing.

2. Description of the Related Art

As applications of nanoparticles are realized, a lot of effort of making and modifying a nano-structure in various ways is dramatically increased. Because of their superior catalytic property, nanoparticles, the major field of nano science, have gone deep into the study. Recently there have been many attempts to apply them to printed electronics. The reason why such nanoparticles are used in printed electronics is to further reduce the width of wirings used in electronic goods. In case of plating or coating existing bulk metal particles with paste method, it is hard to form a fine wiring. Therefore, metal nanoparticles with conductivity have been used for implement of ultra fine wirings.

There are broadly nanoparticles for paste and inkjet printing, based on applicative aspects. The biggest difference between nanoparticles for paste and those for inkjet printing is whether a capping molecule exists. Nanoparticles for paste is used for screen printing. Because the solvent of paste has a high viscosity and a dispersing agent is added additionally easily, there is no need for capping molecules. On the other hand, it is required to add a capping molecule to nanoparticles for inkjet printing to provide dispersion stability because when an additional dispersing agent is added in nanoparticles, it affects surface tension and viscosity of nanoparticles, which have a bad influence upon the ejection stability and decrease the conductivity when they have further applied to a conductive wiring.

Therefore, even though existing nanoparticles for paste are able for low-price mass production with the plasma method, there are problems with its applications for inkjet printing.

SUMMARY

On behalf of settle the above-mentioned problems, one aspect of the present invention provides a method for surface modification of non-dispersible metal nanoparticles which allows dispersity, in order to use non-dispersible metal nanoparticles for paste to nanoparticles for inkjet printing by chemical surface modification.

Additional aspect of the present invention provides modified nanoparticles for inkjet printing thus surface modified.

Additional aspects and advantages of the present invention will become apparent and more readily appreciated from the following description, including the appended drawings and claims, or may be learned by practice of the invention.

According to achieve the technical subject, one the invention may provide a method for surface modification of non-dispersible metal nanoparticles including: mixing metal nanoparticles having an amorphous carbon layer on the particle surface and an alcohol or thiol solvent; mixing a capping molecule having carboxylic groups into the mixed solution; and isolating the metal nanoparticles from the mixed solution. The metal nanoparticles having an amorphous carbon layer can be manufactured by a plasma synthesis method.

According to one embodiment of the invention, the alcohol or thiol solvent is added by from 100 to 5,000 parts by weight with respect to 100 parts by weight of the metal nanoparticles.

According to one embodiment of the invention, the mixing metal nanoparticles with the solvent can be accomplished by reflux reaction.

According to one embodiment of the invention, after mixing metal nanoparticles with the solvent, adding toluene in the mixed solution and heating the mixed solution at the same as or higher temperature than the boiling temperature of the alcohol or thiol solvent used, is further included.

Here, toluene is added by from 500 to 5,000 parts by weight with respect to 100 parts by weight of the metal nanoparticles.

According to one embodiment of the invention, adding at least one acid selected from the group consisting of hydrochloric acid, sulfuric acid, and nitric acid may be further included in mixing metal nanoparticles with the solvent.

Here, the concentration of the acid is 0.0001 to 1M and the acid can be added about 0.1 ml to 10 ml with respect to 1 g of the metal nanoparticles.

Furthermore, the reaction time is 1 to 30 minutes when the acid is added.

According to one embodiment of the invention, using the capping molecule having a hydrophilic tail group, the non-dispersible nanoparticles can be surface-modified, so that the nanoparticles are able to be dispersed in a water-soluble organic solvent.

According to one embodiment of the invention, using a capping molecule having a hydrophobic group, the non-dispersible nanoparticles can be surface-modified, so that the nanoparticles are able to be dispersed in a water-insoluble organic solvent.

According to one embodiment of the invention, the capping molecule is added by from 10 to 3,000 parts by weight with respect to 100 parts by weight of the metal nanoparticles.

According to one embodiment of the invention, mixing the capping molecule can be accomplished by reflux reaction. Here, the reaction time of mixing the capping molecule is 1 to 10 hours.

The invention further provides a method of surface modification of non-dispersible metal nanoparticles, the method including a treatment of the metal nanoparticles having an amorphous carbon layer on their surfaces with a capping molecule having a pi ($\pi$-bond) bond containing head group, According to one embodiment of the invention, the treatment is performed by after adding the metal nanoparticles having an amorphous carbon layer in an alcohol solvent adding the capping molecule having a pi bond ($\pi$-bond) containing head group and stirring.

According to one embodiment of the invention, the pi bond (.pi.-bond) containing group can be selected from the group consisting of alkenyl group, aryl group and heteroaryl group.

According to one embodiment of the invention, using a capping molecule having a hydrophilic group, the non-dispersible nanoparticles can be surface-modified, so that the nanoparticles are able to be dispersed in a water-soluble organic solvent while using a capping molecule having a hydrophobic group, the non-dispersible nanoparticles can be surface-modified, so that the nanoparticles are able to be dispersed in a water-insoluble organic solvent.

Here, the content of the capping molecule is from 10 to 3000 parts by weight with respect to 100 parts by weight of the metal nanoparticles.

According to one embodiment of the invention, after the treatment with the capping molecule, a reaction of the surface-modified nanoparticles and a polymer having a hydrophilic or hydrophobic functional group may be further included.

The invention further provides metal nanoparticles for inkjet printing including, metal nanoparticles;

an amorphous carbon layer coated on the surface of the metal nanoparticles; and a capping molecule bonded to the amorphous carbon layer.

According to one embodiment of the invention, the nanoparticles for inkjet printing can be manufactured by surface-modifying the non-dispersible metal nanoparticles.

DETAILED DESCRIPTION

Hereinafter, according to the present invention, the method for surface modification of non-dispersible metal nanoparticles and metal nanoparticles for inkjet printing thus modified will be described in detail.

Further, before fully explaining specific embodiments of the invention, explanations for nanoparticles for paste manufactured by a general plasma synthesis method will be given first.

Figure 1:
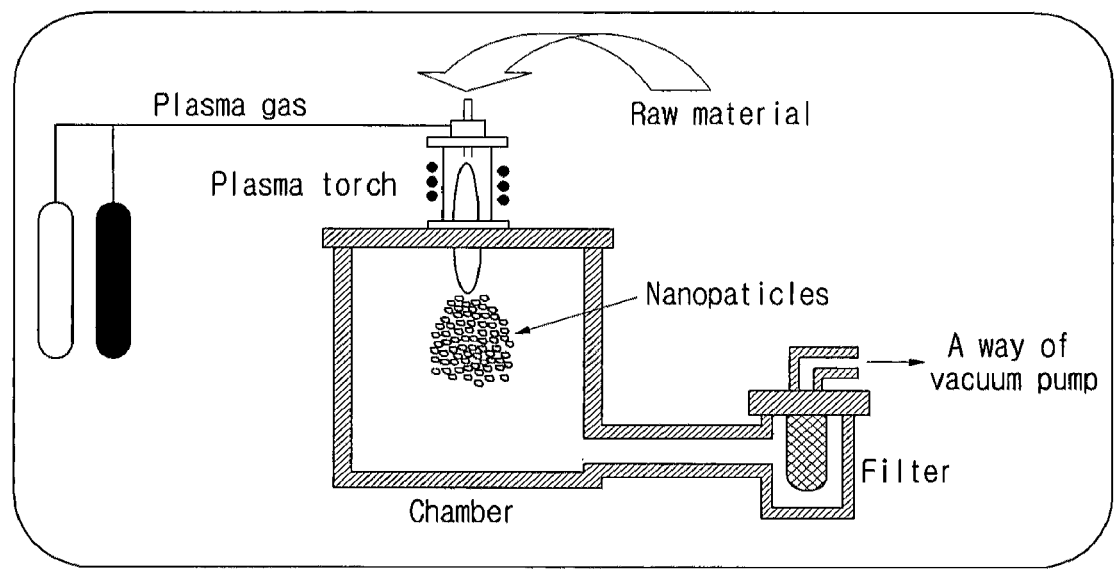
FIG. 1 is a schematic diagram illustrating a general synthesis process of nanoparticles using plasma.

Generally, nanoparticles used in screen printing are mainly synthesized by the plasma synthesis method. FIG. 1 is a schematic diagram illustrating the general synthesis method of nanoparticles using plasma. After gas is activated in plasma state by a large output of microwave, nano-size particles are obtained from raw materials injected using a plasma torch. The nanoparticles thus synthesized have an amorphous carbon layer on the outermost of nanoparticles since organic materials of the precursor are carbonized due to high temperature of the plasma.

Consequently, although the nanoparticles formed by the plasma synthesis can be used for high-viscosity paste, it cannot be used for inkjet printing, because self dispersity of particles is poor.

Figure 2:
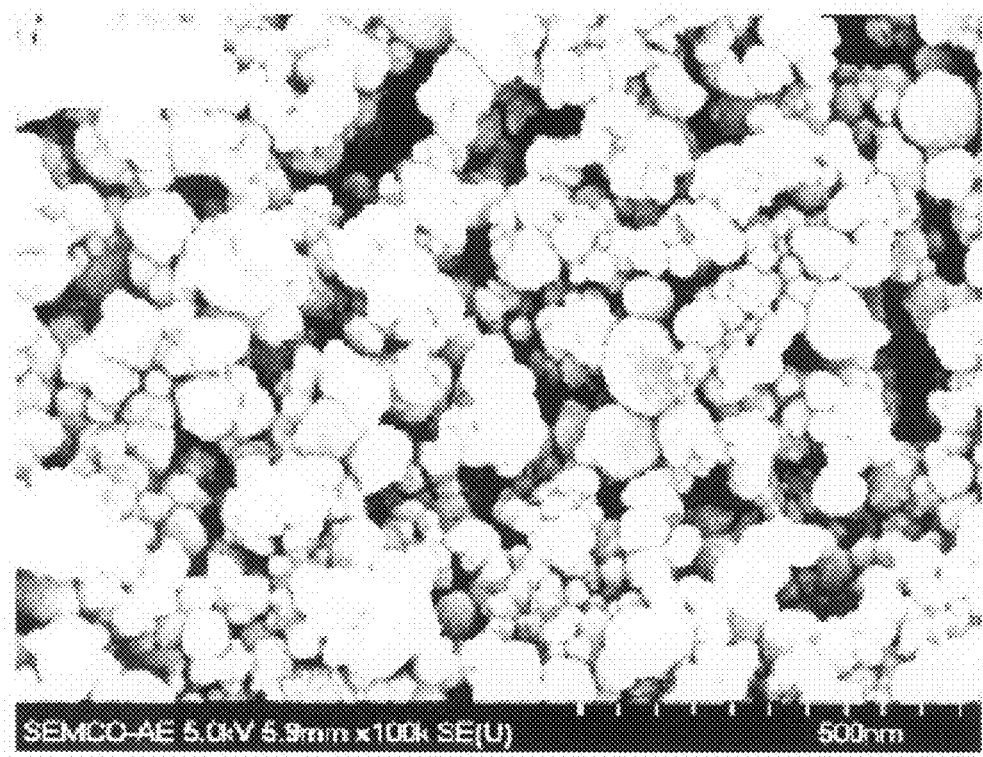
FIG. 2 is FE-SEM photography of copper nanoparticles synthesized by using plasma.

FIG. 2 is a FE-SEM photography of copper nanoparticles synthesized by plasma. Referring to FIG. 2, the size of nanoparticles is 100 nm or less but each nanoparticle is coated with an amorphous carbon layer on its surface.

Figure 3:
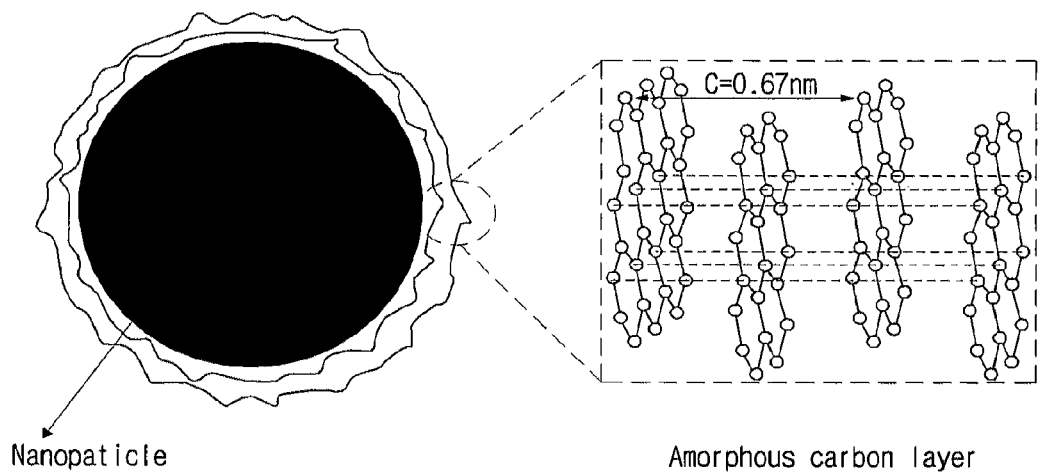
FIG. 3 is a diagram of nanoparticles synthesized by the plasma method.

FIG. 3 illustrates schematically nanoparticles coated with an amorphous carbon layer. In order that each nanoparticle may have dispersity, a capping molecule is grafted to the amorphous carbon layer coated on the surface of the nanoparticles.

In this invention, general nanoparticles coated with an non-dispersible amorphous carbon layer are modified to have dispersity, so that can be used for inkjet printing.

Figure 4:
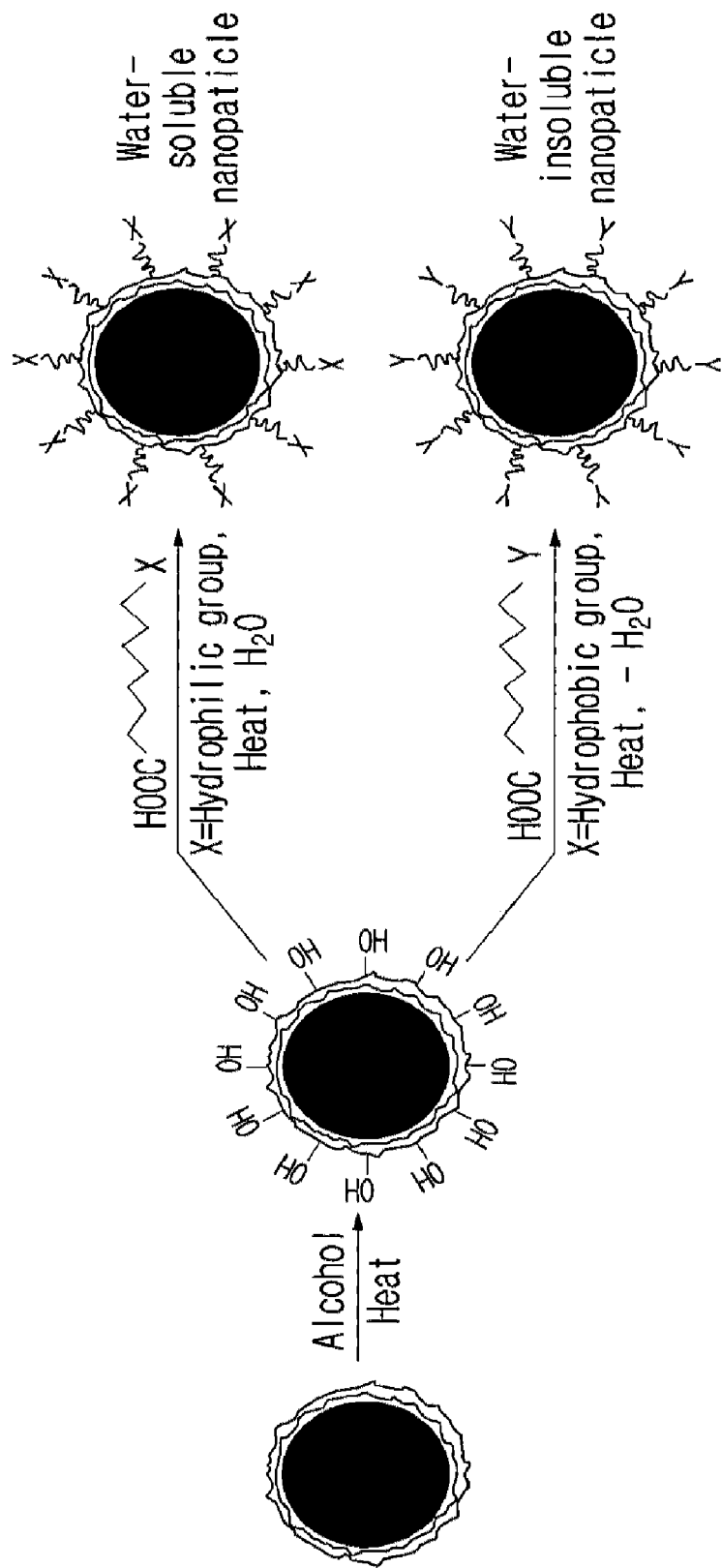
FIG. 4 is a mechanism of surface modification according to one embodiment of the present invention.

FIG. 4 is a simplified mechanism of a surface modification method of non-dispersive metal nanoparticles according to one embodiment of the present invention.

According to one embodiment of the present invention, a surface modification method of non-dispersive metal nanoparticles includes: mixing metal nanoparticles having an amorphous carbon layer on the surface of the particles with an alcohol or thiol solvent; mixing a capping molecule having a carboxylic group in the mixed solution; and isolating metal nanoparticles from the mixed solution.

If metal nanoparticles having an amorphous carbon layer are mixed with an alcohol or thiol solvent in a high temperature, double bonds of an amorphous carbon layer on the surface are broken, so that functional groups of hydroxyl groups (—OH) or thiol groups (—SH) can be formed. In case an acid is added, functional groups such as carboxyl groups (—COOH), sulfuric acid group (—$SO_3H$), and the like can be formed. And then, when those functional groups are polymerized with the capping molecule having a carboxylic head group, the nanoparticles can be surface-modified to be dispersable in a water-soluble solvent or a water-insoluble organic solvent, according to the type of a tail part of the capping molecule.

A surface modification method according to this invention, first includes mixing the metal nanoparticles having an amorphous carbon layer on the surface and an alcohol or thiol solvent.

The metal nanoparticles having an amorphous carbon layer can be metal nanoparticles prepared by the general plasma synthesis method as explained above.

The alcohol or thiol solvent is mixed by from about 100 to about 5,000 parts by weight with respect to 100 parts by weight of the metal nanoparticles. If the content of the solvent is less than 100 parts by weight, the nanoparticles are agglomerated and thus formation of activated functional groups may not be completed. If the content of the solvent exceeds 5,000 parts by weight, it is not preferable because an excess of solvent not used in the reaction is remained.

According to one embodiment of the invention, mixing the metal nanoparticles with the solvent is accomplished by reflux reaction. The metal nanoparticles can be mixed to the solvent while stirring at a temperature of lower than a boiling temperature of the alcohol or thiol solvent, more preferably by reflux. Reflux can maintain the temperature at the solvent boiling temperature constantly, most preferably by reflux while stirring.

According to one embodiment of the invention, in case of mixing just with the alcohol or thiol solvent, without adding any acid such as nitric acid and so on, for better forming of functional groups like hydroxyl groups, thiol groups, and the like, toluene can be added into the mixed solution. When toluene is added, the mixture is heated at a higher temperature than the boiling temperature of the alcohol or thiol solvent to easily form the functional groups and remove an excessive solvent because of intensive reaction.

Here, toluene is added by from about 500 to about 5000 parts by weight with respect to 100 parts by weight of the metal nanoparticles. If the content of toluene is less than 500 parts by weight, the formation of activated functional groups may not be completed because of agglomeration of the metal nanoparticles.

If the content of toluene exceeds 5,000 parts by weight, it is not economical due to an excess use of the solvent.

After forming hydroxyl groups by breaking double bonds of an amorphous carbon layer, the capping molecule having a carboxylic group is added into the mixed solution.

The carboxylic groups of the capping molecule are polymerized with the hydroxyl groups of the amorphous carbon layer to bond tightly. The metal nanoparticles can be dispersed in a water-soluble organic solvent or a water-insoluble organic solvent, depending on the type of the tail part of the capping molecule. If the tail part of the capping molecule is a hydrophilic group, the non-dispersible nanoparticles can be surface-modified nanoparticles which are able to be dispersed in a water-soluble organic solvent. On the other hand, if the tail part is a hydrophobic group, the non-dispersible nanoparticles can be surface-modified nanoparticles which are able to be dispersed in a water-insoluble organic solvent.

According to one embodiment of the invention, the capping molecules is added by from 10 to 3,000 parts by weight with respect to 100 parts by weight of the metal nanoparticles. If the content of the capping molecule is less than 10 parts by weight, it is not preferable because the capping molecule such as alkyl acid, amino acid, and the like cannot cover all nanoparticle surfaces. If the content of the capping molecule exceeds 3,000 parts by weight, it is not economical due to an excess use.

Mixing with the capping molecule is accomplished by reflux and the reaction time is from 1 to 10 hours. If the reaction time is less than 1 hour, the reaction can be finished before the capping molecule is completely bonded. If the reaction time exceeds 10 hours, it is not preferable because there is no more effect on the reaction yield.

According to one embodiment of the invention, during mixing the metal nanoparticles, at least one acid selected from the group consisting of hydrochloric acid, sulfuric acid, and nitric acid may be further added. In case of adding an acid, a simplified mechanism of surface modification is shown in FIG. 5.

Figure 5:
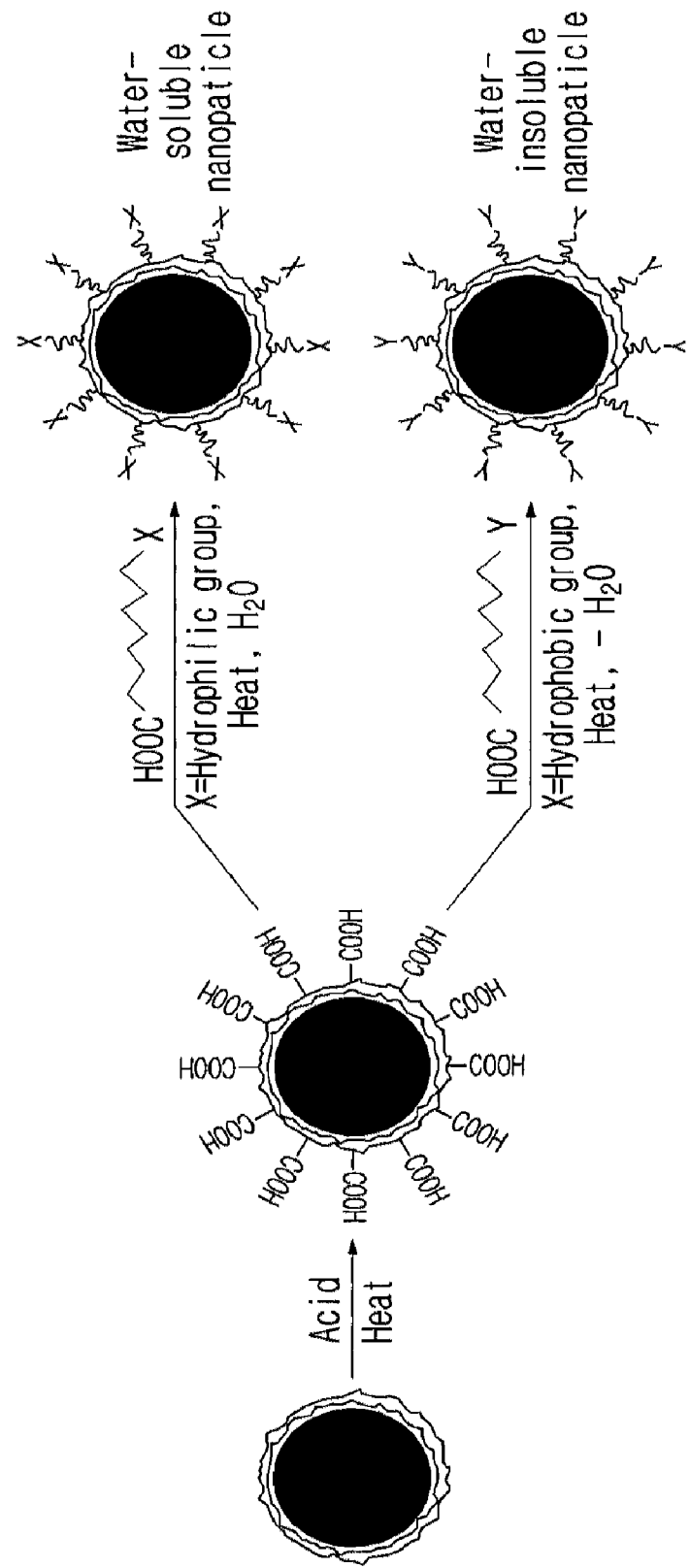
FIG. 5 is a mechanism of surface modification according to another embodiment of the present invention.

According to FIG. 5, when the acid is added in the presence of a solvent such as alcohol and the like, the double bonds of the amorphous carbon layer of the metal nanoparticles can be broken and substituted to functional groups such as carboxyl groups (—COOH), sulfuric acid groups (—SO$_3$H) and the likes. Successively the functional groups and the carboxylic groups are polymerized.

Here, the concentration of the acid is about 0.0001 to about 1M and the acid is added in the ml ratio of about 0.1 to about 10 with respect to 1 g of the metal nanoparticles. If the concentration of the acid is less than 0.0001M or the acid is added less than 0.1 ml ratio, the amorphous carbon layer cannot be substituted perfectly to the functional groups such as carboxylic groups. If the concentration of the acid exceeds 1M or the acid is added more than 10 ml ratio, it is not preferable because the metal nanoparticles would be damaged.

Additionally, when the acid is added, the reaction time is 1 to 30 minutes. If the reaction time is less than 1 minute, the amorphous carbon layer cannot be substituted perfectly to the functional groups such as carboxylic groups. If the reaction time exceeds 30 minutes, the metal nanoparticles would be damaged.

According to another aspect of the invention, the surface modification method is accomplished by treating the metal nanoparticles having an amorphous carbon layer on the surface of the particles with the capping molecule having a pi bond (.pi.-bond) group.

Figure 6:
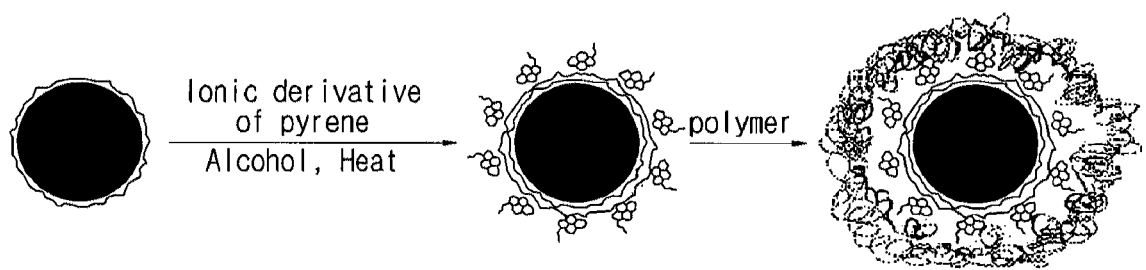
FIG. 6 is a mechanism of surface modification according to another embodiment of the present invention.

A simplified mechanism of the above described surface modification method is shown in FIG. 6.

According to FIG. 6, the surface modification method provides dispersity to the non-dispersible metal nanoparticles by utilizing pi bonds (π-bonds) of the amorphous carbon layer on the surface of the particles, that is directly treating with the capping molecule having a pi bond (π-bond) head group such as alkenyl group, aryl group and heterocyclic alkenyl group, and the like, without introducing functional groups such as hydroxyl groups, carboxylic groups, and so on.

According to one embodiment of the invention, such treatment is performed by mixing the metal nanoparticles having an amorphous carbon layer and an alcohol solvent and adding the capping molecule having a pi bond (.pi.-bond) containing head group. The pi bond (.pi.-bond) containing head part is selected from the group consisting of alkenyl group, aryl group and heterocyclic alkenyl group. If the capping molecule having a hydrophilic tail group is used, the non-dispersible nanoparticles can be surface-modified, so that the nanoparticles are able to be dispersed in a water-soluble organic solvent. On the other hand if the capping molecule having a hydrophobic group is used, the non-dispersible nanoparticles can be surface-modified, so that the nanoparticles are able to be dispersed in a water-insoluble organic solvent.

Here, the content of the capping molecule is from about 10 to about 3,000 parts by weight with respect to 100 parts by weight of the metal nanoparticles. The reason is explained above.

According to one embodiment of the invention, for increase the dispersity about organic solvents, the metal nanoparticles surface-modified with the capping molecule are further reacted with a polymer having a hydrophilic or hydrophobic functional group.

According to the surface modification method of the invention, it allows the production of nanoparticles for inkjet printing, which was difficult for mass production, in mass scale by using existing non-dispersible nanoparticles mass-produced in tone scale. Also, because the non-dispersible nanoparticles by plasma synthesis. etc. are low-price, the price of inkjet ink made by the nanoparticles surface-modified can be reduced effectively.

Another aspect of the invention provides nanoparticles for inkjet printing including, metal nanoparticles; an amorphous carbon layer coated on the surface of the metal nanoparticles; and a capping molecule bonded to the amorphous carbon layer.

The nanoparticles for inkjet printing can be manufactured by surface-modifying the non-dispersible metal nanoparticles as described above, such surface-modified nanoparticles can be useful in manufacturing nano-ink for inkjet printing, because the capping molecule bonded on amorphous carbon layer provides the dispersity in an organic solvent.

Hereinafter, while explanations will be given in greater detail with specific examples, the invention is not limited to the examples stated below.

Example 1

1 g of amorphous carbon-coated nanoparticles was added to 10 ml of ethanol while stirring and refluxed. After then, 30 g of toluene was added. The temperature was raised above the boiling point of the alcohol to remove the alcohol. 10 g of oleic acid was added and this solution was reacted at reflux condition for 4 hours. After then, nanoparticles were separated out by filtering and the separated nanoparticles were washed with 30 ml of toluene more than 3 times. These nanoparticles were dried in a vacuum oven at 50° C. to yield nanoparticles which are able to be dispersed in an organic solvent.

Example 2

1 g of amorphous carbon-coated nanoparticles was added in 10 ml of ethanol while stirring. After 0.1 ml of 0.01M nitric acid was added, the reaction solution was reacted for 10 minutes at reflux condition. After then, nanoparticles were separated by filtering and centrifuging and dried in a vacuum oven. The 1 g of the nanoparticles was dissolved in 10 ml of ethanol. After then, 10 g of 1-hydroxy-2-naphthoic acid was added in the reaction solution and this reaction solution was reacted at reflux condition for 4 hours. After then, nanoparticles were separated by filtering and the separated nanoparticles were washed with 30 ml of ethanol more than 3 times. These nanoparticles were dried in a vacuum oven at 50° C. to yield nanoparticles which are able to be dispersed in a water-based solvent.

Example 3

1 g of amorphous carbon-coated nanoparticles was added in 10 ml of ethanol while stirring. After 0.1 ml of 0.01M sulfuric acid was added, the reaction solution was reacted for 10 minutes at reflux condition. After then, nanoparticles were separated by filtering and centrifuging and dried in a vacuum oven. After then, the nanoparticles were reacted with 20 ml of $SOCl_2$ at 65° C. for 1 hour to substitute the carboxylic groups on the surface to —COCl groups. 1 g of the surface-modified nanoparticles was dissolved in 10 ml of ethanol. After then, 10 g of 1,2-bis-(10,12-tricosadiynoyl)-sn-glycero-3-phosphoethanolamine was added and this reaction solution was reacted at reflux condition for 4 hours. After then, nanoparticles were separated by filtering and the separated nanoparticles were washed with 30 ml of ethanol more than 3 times. These nanoparticles were dried in a vacuum oven at 50° C. to yield nanoparticles which are able to be dispersed in a water-based solvent.

Example 4

1 g of amorphous carbon-coated nanoparticles was added in 10 ml of ethanol while stirring. After 10 g of 1-pyrenepropylamine hydrochloride (PyrNH3) was added, this reaction solution was stirred for 3 hours. After then, nanoparticles were separated by filtering and centrifuging and dried in a vacuum oven to provide nanoparticles which have PyrNH3 on the surface. 10 g of a polymer, polystylene sulfate sodium salt, was added in this reaction solution and reacted for 5 hours. After then, nanoparticles were separated by filtering and the separated nanoparticles were washed with 30 ml of ethanol more than 3 times. These nanoparticles were dried in a vacuum oven at 50° C. to yield nanoparticles which are able to be dispersed in a water-based solvent.

The invention is not limited to the examples stated above and it is also apparent that more changes may be made by those skilled in the art without departing from the principles and spirit of the present invention.

What is claimed is:

1. A method for surface modification of non-dispersible metal nanoparticles, the method comprising:
   mixing metal nanoparticles having an amorphous carbon layer on the particle surface and alcohol or thiol solvent;
   mixing a capping molecule having a carboxylic group in the mixed solution; and
   separating the metal nanoparticles from the mixed solution,
   wherein the mixing metal nanoparticles with an alcohol or thiol solvent further comprises adding at least one acid selected from the group consisting of hydrochloric acid, sulphuric acid, and nitric acid,
   wherein the concentration of the acid is about 0.0001 to about 1M and the acid is added about 0.1 ml to about 10 ml with respect to 1 g of the metal nanoparticles,
   wherein the reaction time of the mixing metal nanoparticles with an alcohol or thiol solvent is about 1 to about 30 minutes if the acid is added.

2. The method of claim 1, wherein the metal nanoparticles having an amorphous carbon layer are manufactured by a plasma synthesis method.

3. The method of claim 1, wherein the alcohol or thiol solvent is mixed from about 100 to about 5000 parts by weight with respect to 100 parts by weight of the metal nanoparticles.

4. The method of claim 1, wherein the mixing nanoparticles with an alcohol or thiol solvent is accomplished by reflux reaction.

5. The method of claim 1, further comprising:
   adding toluene into the mixed solution after mixing metal nanoparticles with an alcohol or thiol solvent; and
   heating the mixture at a boiling temperature or higher of the alcohol or thiol solvent.

6. The method of claim 5, wherein the toluene is added from about 500 to about 5000 parts by weight with respect to 100 parts by weight of the metal nanoparticles.

7. The method of claim 1, wherein the capping molecule includes a carboxylic group and a hydrophilic group, and modifies the non-dispersible nanoparticles to nanoparticles able to be dispersed in a water-soluble organic solvent.

8. The method of claim 1, wherein the capping molecule includes a carboxylic group and a hydrophobic group, and modifies the non-dispersible nanoparticles to nanoparticles able to be dispersed in a water-insoluble organic solvent.

9. The method of claim 1, wherein the capping molecule is added from about 10 to about 3000 parts by weight with respect to 100 parts by weight of the metal nanoparticles.

10. The method of claim 1, wherein the mixing with the capping molecule is accomplished by reflux reaction.

11. The method of claim 1, wherein the reaction time of the mixing with the capping molecule is 1 to 10 hours.

12. A method for surface modification of non-dispersible metal nanoparticles comprising a treatment of metal nanoparticles having an amorphous carbon layer on the particle surface with a capping molecule having a pi bond ($\pi$-bond)-containing group,
   wherein the treatment is accomplished by adding the metal nanoparticles having an amorphous carbon layer into an alcohol solvent while stirring and adding the capping molecule having a pi bond ($\pi$-bond)-containing group while stirring,
   wherein the adding the metal nanoparticles with an alcohol solvent further comprises adding at least one acid selected from the group consisting of hydrochloric acid, sulphuric acid, and nitric acid,
   wherein the concentration of the acid is about 0.0001 to about 1M and the acid is added about 0.1 ml to about 10 ml with respect to 1 g of the metal nanoparticles, wherein the reaction time of the mixing metal nanoparticles with an alcohol solvent is about 1 to about 30 minutes if the acid is added.

13. The method of claim 12, wherein the pi bond (π-bond)-containing group is selected from the group consisting of aryl group, alkenyl group and heteroaryl group.

14. The method of claim 12, wherein the capping molecule includes pi bond (π-bond)-containing group and a hydrophilic group, and modifies the non-dispersible nanoparticles to nanoparticles able to be dispersed in a water-soluble organic solvent.

15. The method of claim 12, wherein the capping molecule includes pi bond (π-bond)-containing group and a hydrophobic group, and modifies the non-dispersible nanoparticles to nanoparticles able to be dispersed in a water-insoluble organic solvent.

16. The method of claim 12, wherein the content of the capping molecule is from about 10 to about 3000 parts by weight with respect to 100 parts by weight of the metal nanoparticles.

17. The method of claim 12, further comprising reacting the surface-modified nanoparticles with a polymer having hydrophilic or hydrophobic functional groups after the treatment with the capping molecule.

* * * * *